United States Patent [19]

Billet

[11] 4,234,067
[45] Nov. 18, 1980

[54] CLUTCH RELEASE BEARING

[75] Inventor: René Billet, Lamorlaye, France

[73] Assignee: Societe Anonyme Francaise du Ferodo, France

[21] Appl. No.: 864,803

[22] Filed: Dec. 27, 1977

[30] Foreign Application Priority Data

Dec. 30, 1976 [FR] France .............................. 76 39540
Dec. 9, 1977 [FR] France .............................. 77 37119

[51] Int. Cl.³ ........................................... F16C 33/30
[52] U.S. Cl. .................................... 192/98; 192/99 A
[58] Field of Search ................. 192/98, 110 R, 110 B, 192/99 A, 85 CA; 308/233

[56] References Cited

U.S. PATENT DOCUMENTS

| 1,402,458 | 1/1922 | Strom | 192/98 |
| 2,891,644 | 6/1959 | Davis | 192/85 CA |
| 3,460,427 | 8/1969 | Baumgarten | 85/8.8 |
| 3,474,888 | 10/1969 | Carlson et al. | 192/113 B |
| 3,935,631 | 2/1976 | Doerner | 308/DIG. 7 |

FOREIGN PATENT DOCUMENTS 936475 9/1963 United Kingdom ............... 192/85 CA

Primary Examiner—George H. Krizmanich
Attorney, Agent, or Firm—Charles E. Brown

[57] ABSTRACT

The invention provides a clutch release bearing assembly which incorporates guide means in the form of at least one, and preferably a plurality of guide passages which are laterally offset and parallel to the operating axis of the bearing; the guide passages engage over guide pins extending from the adjacent wall of the clutch casing.

14 Claims, 17 Drawing Figures

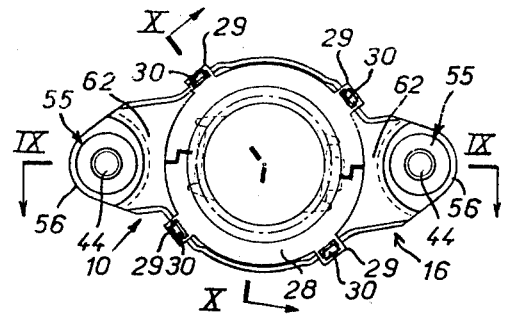
FIG.8
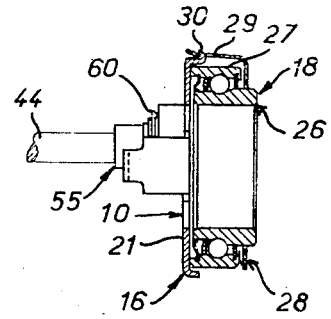
FIG.10
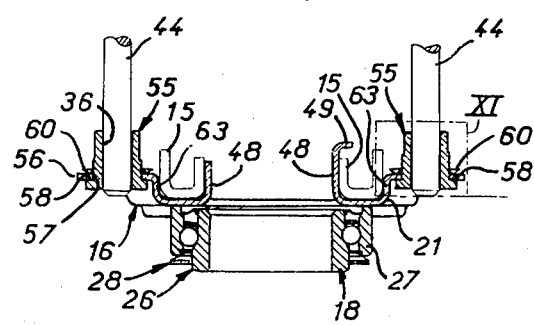
FIG.9
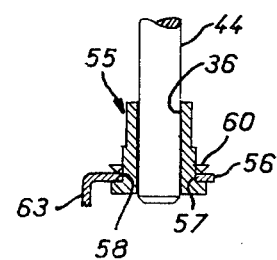
FIG.11
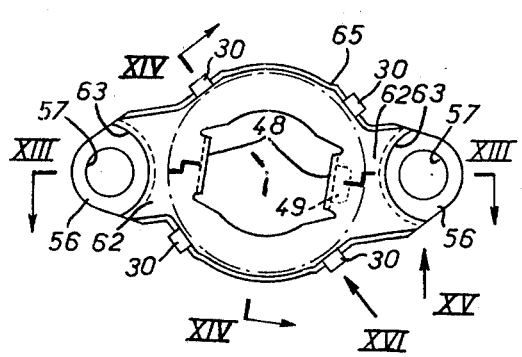
FIG.12
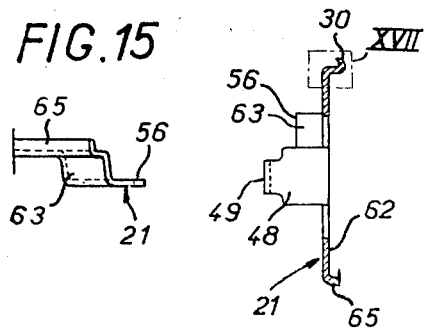
FIG.14
FIG.15
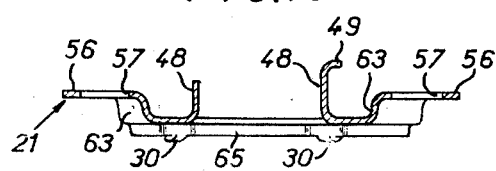
FIG.13
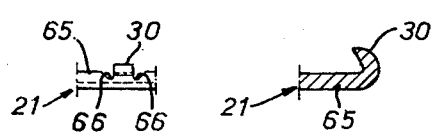
FIG.16 FIG.17

CLUTCH RELEASE BEARING

BACKGROUND OF THE INVENTION

The present invention relates generally to clutch release bearings, particularly for automobile vehicles.

As is known, clutch release bearings of this kind generally comprise an operating element intended to be subjected to the action of a movement control means, which in practice is a clutch release fork, and a driving element intended to act, through the action of the operating element, on the release device of the clutch with which it is associated.

The present invention relates more particularly to the guiding of a clutch release bearing during its movement.

This guiding is generally effected by one or other of two separate methods.

According to the first of these methods, which is now rarely used except for so-called graphited clutch release bearings which do not incorporate ball bearings, the clutch release bearing is carried by the release fork with which it is associated.

This arrangement has the disadvantage that during its movement the clutch release bearing follows a circular and not a rectilinear path.

According to the second method of guidance, which at the present time is the one most usually employed, particularly for clutch release bearings having a ball bearing interposed between the operating and driving elements, the clutch release bearing is mounted for axial sliding on a guide member, for example a tube or sleeve with which it is coaxial, and the operating element is provided in its central zone with a guide passage adapted to permit its engagement on the guide member.

This arrangement has the advantage of permitting rectilinear guiding of the clutch release bearing along the actual axis of the clutch release device on which it is to act.

However, this method on the one hand entails the utilisation of a guide member which may be difficult to install and which may be expensive to produce, particularly when minimum longitudinal dimensions have to be achieved, while on the other hand in order to facilitate the sliding of the clutch release bearing on the guide member, it is also necessary to provide its operating element with a sleeve, the thickness of which cannot fail to increase correspondingly the radial dimensions of the clutch release bearing.

The general object of the present invention is to provide an arrangement which avoids these disadvantages, while achieving accurate rectilinear guiding of the clutch release bearing in question.

SUMMARY

More precisely, the present invention has as its object a clutch release bearing, particularly for an automobile vehicle, of the kind comprising generally an operating element intended to be subjected to the action of a movement control means, and an actuating element which is intended to act, under the action of the operating element, on the release device of a clutch, the said operating element having a guide passage adapted to permit the engagement of the whole arrangement on a guide member, this clutch release bearing being characterised in that the aforesaid guide passage is disposed laterally, at a distance from the axis of the clutch release bearing; it is preferable for at least two lateral guide passages of this kind to be provided on the aforesaid operating element.

In consequence, the casing wall near which the clutch release bearing of the invention is installed carries a number of parallel projecting pins corresponding to the number of lateral passages with which the said clutch release bearing is provided, the said clutch release bearing being mounted for sliding on the said pins by means of the said passages.

Pins can normally be easily and inexpensively disposed on a casing wall, which in practice would be the clutch casing, whatever requirements have to be met for a wall of this kind, having regard to the members contained in the casing to which it belongs, or which are associated with the said casing. It is in fact always possible to find in one position or another the space necessary for installing these pins.

However this may be, the clutch release bearing being guided laterally, that is to say outside the bearing and no longer in its axis, it is no longer necessary to provide for is engagement on any other axial guide member, thus freeing the space used for installing a guide member of this kind, both axially and radially, and eliminating the cost of its manufacture.

Furthermore, it is likewise no longer necessary to provide the operating element of the clutch release bearing with a sleeve of any kind, thus making it possible, other conditions being equal, to reduce the diametrical dimensions of the clutch release bearing and, in the case of a clutch release bearing utilising a ball bearing, to give it in a smaller diameter.

Although the invention may be applied to any type of clutch release bearing, that is to say both to graphited clutch release bearings and to clutch release bearings provided with ball bearings, whether in the latter case the release bearings are self-centering or not, it is particularly advantageous when the release bearing is self-centering, that is to say when a self-centering connection is made between its driving element and its operating element.

Taking into account the accurate rectilinear guiding of the clutch release bearing achieved by the guide means, a self-centering connection of this kind is in fact fully justified and in practice is found to be particularly advantageous.

BRIEF DESCRIPTION OF THE DRAWINGS

FIG. 8 is a view in elevation of a modified form of construction of a clutch release bearing according to the invention;

FIGS. 9 and 10 are views in axial section respectively on the broken lines IX—IX and X—X in FIG. 8;

FIG. 11 shows on a larger scale the detail of FIG. 9 marked by a box XI on the latter;

FIG. 12 is a view in elevation of the metal plate forming the framework of the clutch release bearing according to the invention;

FIGS. 13 and 14 are views in axial section of this plate, respectively on the broken lines XIII—XIII and XIV—XIV in FIG. 12;

FIGS. 15 and 16 are partial lateral views thereof respectively in the directions of the arrows XV and XVI in FIG. 12;

FIG. 17 shows on a larger scale a detail of FIG. 14 which is marked by a box XVII on the latter.

DESCRIPTION OF THE PREFERRED EMBODIMENTS

For the sake of greater clarity of the drawings, the clutch release bearing of the invention is shown in relatively heavy lines, while the assembly of which it forms part has been shown in relatively fine lines.

Figure 1:
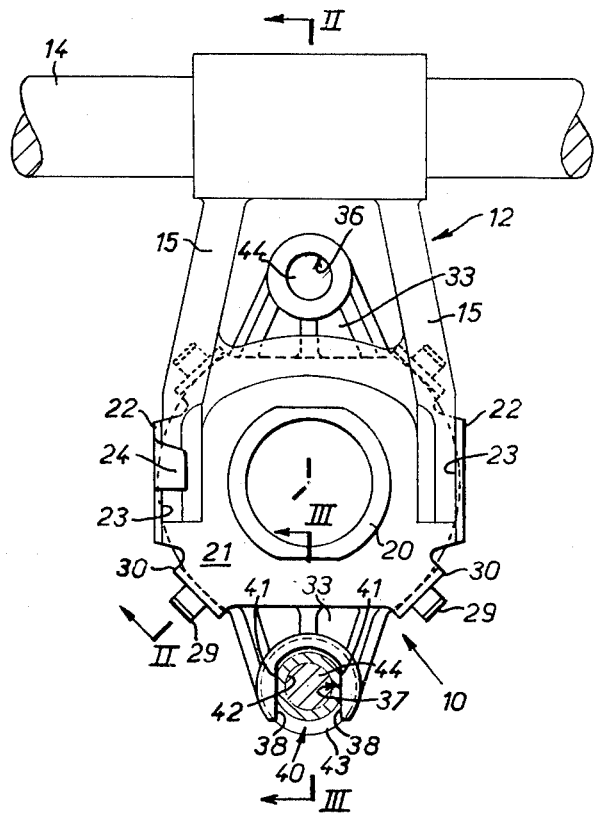
FIG. 1 is a view in elevation of a clutch release bearing according to the invention, in the direction of the arrow I in FIG. 2.
Figure 2:
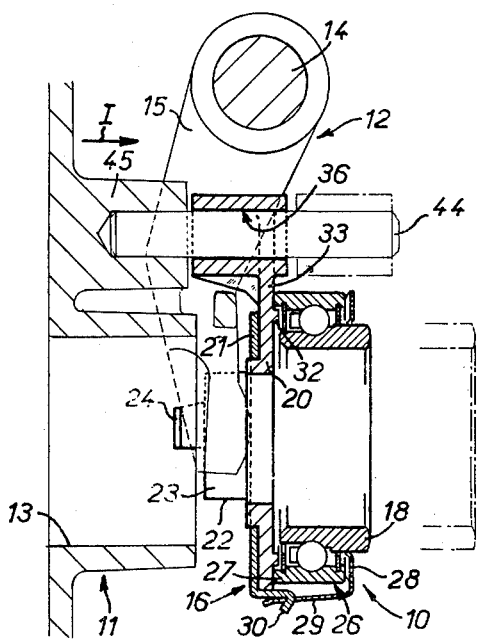
FIG. 2 is a view in axial section of this clutch release bearing, taken on the broken line II—II in FIG. 1.

Thus, in FIGS. 1 and 2 the clutch release bearing according to the invention can be seen at 10, the wall of the casing near which the clutch release bearing is disposed can be seen at 11, and the clutch release fork associated with the clutch release bearing is shown at 12.

In a manner known per se the casing wall 11, which normally belongs to the casing of the clutch with which the clutch release bearing 10 is associated but which may also belong to the gearbox casing, particularly when the latter is disposed directly next to the clutch, has a bore 13 adapted for the passage of the driven shaft of the clutch (not shown).

Likewise in a manner known per se, the release fork 12 is mounted pivotally on a shaft 14 carried for example by a part (not shown) of the casing wall 11, and has two fingers 15 for acting on the clutch release bearing 10.

Similarly in a manner known per se, this clutch release bearing 10 is formed generally of an operating element 16 by which, for controlling its movement, is subjected to the action of the fingers 15 of the release fork 12, and of a driving element 18 by which under the action of the operating element 16 it is adapted to act on the release device of a clutch (not shown), the said operating element 16 and the said driving element 18 both forming generally annular parts for engagement of the assembly around the driven shaft of the clutch.

In the embodiment illustrated, the operating element 16 comprises a transverse plate cut away at its centre 20, which is for example of synthetic material and against which, on its rear face, that is to say on its face which is opposite to the clutch release device to be controlled, there is applied a reinforcing counter-plate 21 engaged by the free ends of the fingers 15 of the clutch release fork 12.

In order to guide these fingers, the reinforcing counter-plate 21 is provided in diametrically opposite positions with two wings 22 folded over at right angles, their mutually opposite faces forming perpendicularly to a transverse plane two parallel shoulders 23 adapted to support the fingers.

In the embodiment illustrated, one of these wings 22 is provided at its end, beyond the corresponding finger 15 of the clutch release fork 12, with a return 24 folded over at right angles facing the said finger, for axially retaining the clutch release bearing 10 by means of the release fork 12 during the operation of the assembly to which the said clutch release bearing belongs.

In the embodiment illustrated, the driving element 18 of the clutch release bearing 10 is formed by the inner track of a ball bearing 26 whose outer track 27 is held applied against the front face of the plate 20 of the operating element 16 by an axially acting undulating spring washer 28, the latter being attached by generally axial lugs 29 to hooks 30 radially extending around the counter-plate 21 of the operating element 16 and bearing against the front edge of the outer track 27.

A self-centering connection operating by translation is thus established between the driving element 18 and the operating element 16, the driving element 18, and more generally the ball bearing 26 with which it is associated, having, in a plane perpendicular to the axis of the assembly defined by the front face of the transverse plate 20 of the operating element 16, an omnidirectional latitude of movement under the control of the spring washer 28 and within the limits of radial clearance defined by an annular projection 32 which is provided for the purpose on the front face of the plate 20 of the operating element 16, and which is surrounded by the outer track 27 of the ball bearing 26.

These arrangements do not in themselves form part of the present invention and will therefore not be described here in greater detail.

Likewise in a manner known per se the operating element 16 of the clutch release bearing 10 has at least one guide passage adapted to permit its engagement on a guide member.

According to the invention this guide passage is disposed laterally, that is to say at a distance from the axis of the clutch release bearing 30, and externally of the latter.

In practice, and as illustrated, the operating element 16 of the clutch release bearing 10 thus possesses laterally at least two guide passages, and the latter are formed on radial extensions 33 of the transverse plate 20 of the operating element 16.

Figure 3:
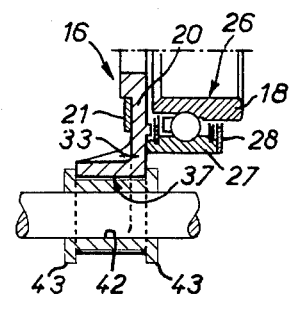
FIG. 3 is another partial view in axial section on the line III—III in FIG. 1.

In the example shown in FIGS. 1 to 3 these radial extensions 33 are two in number and are in positions substantially diametrically opposite one another, arranged substantially at 90° with the parallel shoulders 23 formed by the wings 22 in such a manner that the guide passages with which they are provided are angularly offset in relation to the shoulders.

In the embodiment illustrated in FIGS. 1 to 3, for a radial extension 33 the corresponding guide passage is closed peripherally and thus substantially forms a lug 36.

This lug 36 is cylindrically elongated with generatrices parallel to the axis of the clutch release bearing 10 with which it is associated, but its inner wall may have any cross-section; in the example illustrated this section is circular.

Conjointly, the guide passage formed on the other radial extension 33 is in the example illustrated open laterally, in a radial direction opposite to the axis of the clutch release bearing and thus substantially forms a yoke 37.

This yoke 37 has two radial guide flanks 38 which face one another and which are substantially parallel to the axial plane of the assembly which passes through its median zone, and with it is associated a tubular sleeve 40 which externally has two parallel flanks 41 spaced apart by a distance slightly less than the spacing of the flanks 38, and which is thus adapted to be engaged radially for sliding in the latter.

In the example illustrated this tubular sleeve 40 has an internal bore 42 whose circular cross-section is identical to that of the previously described lug 36, and which at its ends has radial collars 43 for axially locating it in the yoke 37.

Like the lug 36, the yoke 37 is generally elongated cylindrically parallel to the axis of the assembly; a lug 36 and a yoke 37 of the kind described may be made in one piece with the transverse plate 20, during the moulding of these parts, and, in accordance with the methods employed for a moulding technique of this kind, various stiffening ribs may locally reinforce the radial extensions 33.

According to the invention the casing wall 11 conjointly carries around its bore 13 a number of parallel projecting pins 44 corresponding to the number of lateral guide passages provided in the clutch release bearing 10, the said pins 44, which are thus two in number in the example illustrated in FIGS. 1 to 3, extending generally parallel to the axis of the bore 13.

By means of its lateral guide passages 36 and 37 the clutch release bearing 10 is mounted for sliding on the pins 44, with the interposition of the tubular sleeve 40 described above in the case of the yoke constituting the guide passage 37.

In the example illustrated, the pins 44 are identical, being cylindrical pins of circular section; for example, as illustrated, they may be driven with a force fit into bosses 45 provided for the purpose in the casing wall 11.

As will easily be understood, during its displacement resulting from the pivoting of the release fork 12, the clutch release bearing 30 is thus accurately guided in a rectilinear movement of translation along its axis, as indicated in broken lines in FIG. 2.

In principle this axis coincides with that of the clutch release device on which the clutch release bearing has to act.

Nevertheless, the fact that the said clutch release bearing is self-centering permits systematic compensation for any misalignment of the axes in question.

Furthermore, the axial sliding arrangement of the yoke 37 and of the sleeve 40 on which the former is engaged make it possible for any manufacturing tolerances between the spacing of the pins 44 and that of the corresponding lateral guide passages of the clutch release bearing 30 to be compensated, and also permits any variation of this spacing which in the course of operation may occur as the result of possible differential thermal expansion of the corresponding members to be compensated.

It should be emphasized in this connection that the lateral offsetting of the guide passages of the clutch release bearing according to the invention provides the advantage that it is possible to use a device of the type composed of a yoke 37 and sleeve 40 associated with it, for the purpose of compensating for any differential expansion.

This possibility is excluded when the guiding of the clutch release bearing is effected by engagement of a sleeve with a central guide tube with which it is coaxial, this arrangement making it necessary to provide significant installation tolerances between these two members since this sleeve is usually of synthetic material in order to improve sliding conditions, whereas the guide tube on which it is engaged is of metal or alloy.

In the foregoing example, the radial extensions 33 provided with the lateral guide passages for the clutch release bearing 30 according to the invention are disposed in positions substantially diametrically opposite one another.

It is however obvious that this need not be the case, although this arrangement is particularly favourable for obtaining good guidance; depending on the particular requirements inherent in each case of application, the pins 44 adapted to guide the clutch release bearing may on the contrary be installed in the most convenient possible manner having regard to the space available on the surface of the casing wall in question, these positions not necessarily being strictly diametrically opposite but on the contrary being more or less angularly offset in relation to diametrically opposite positions.

Figure 4:
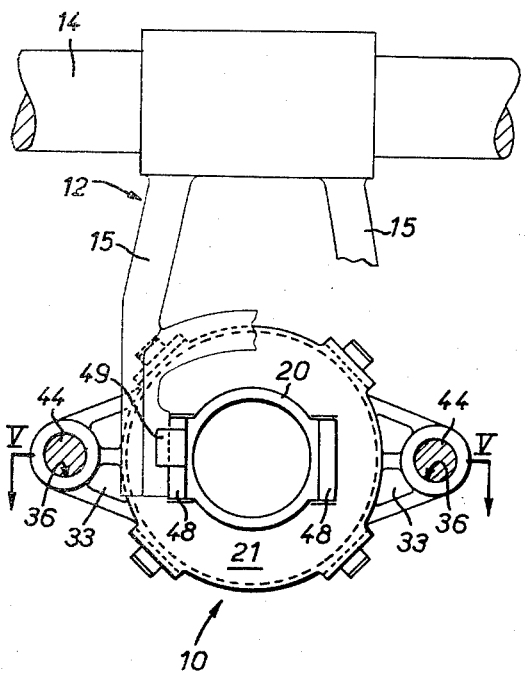
FIG. 4 is a view similar to that in FIG. 1, broken away locally, and relates to a modified embodiment.
Figure 5:
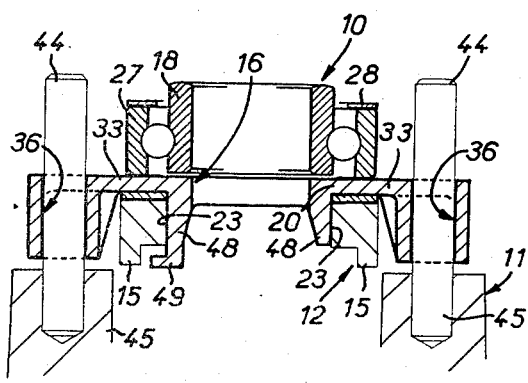
FIG. 5 is a view in axial section of this modified embodiment, taken on the line V—V in FIG. 4.

In the modified embodiment illustrated in FIGS. 4 and 5 the lateral guide passages of the clutch release bearing 30 both comprise circularly closed lugs 36 and are disposed in positions corresponding to the parallel shoulders 23 provided on the operating element 16 of this clutch release bearing for supporting the finger 15 of the release fork 12.

In this modified arrangement these parallel shoulders 23 are formed by the opposite faces of axial extensions 48 provided for this purpose on the plate 20 of the operating element 16, on each side of its axial passage, and the fingers 15 of the release fork 12 are thus supported on the inner faces opposite these fingers.

Moreover, in this modified embodiment one of the axial extensions 48 in question terminates in a right-angled return 49 for axially retaining the clutch release bearing 30, as explained above.

Figure 6:
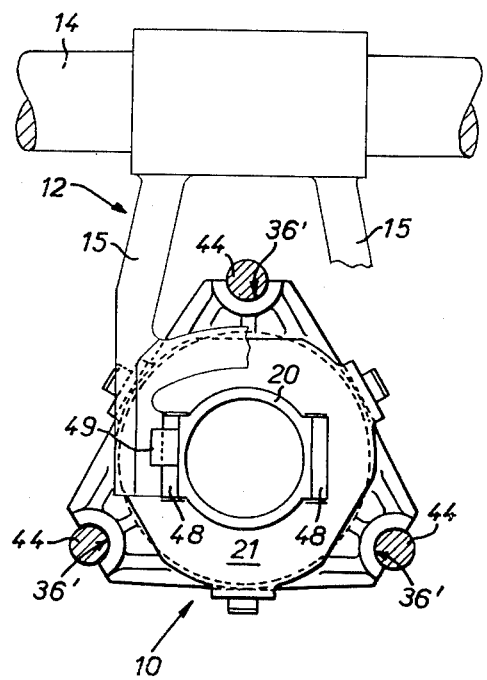
FIG. 6 is a similar view to that in FIG. 4 and relates to another modified embodiment.

In the modified embodiment illustrated in FIG. 6, three lateral guide passages are provided. These are passages 36' rather similar to the lugs 36 previously described, that is to say passages by which the thrust bearing can be directly engaged on pins 44, but open laterally, for example to half the diameter as illustrated, in a direction which may for example, and as illustrated, be a radial direction opposite to the axis of the thrust bearing. In the foregoing, any axial retention provided for the clutch release bearing 30 is achieved by cooperation with a right-angled return on the said clutch release bearing with one of the fingers of the associated clutch release fork 12.

Figure 7:
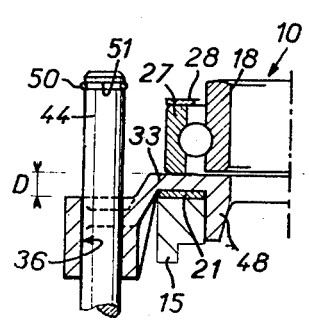
FIG. 7 shows a detail of FIG. 5 and relates to another modified embodiment.

In the embodiment illustrated in FIG. 7, which may be applied to any of the embodiments so far described, this retention is effected with the aid of a radial projection provided for the purpose near the free end of one of the pins 44 on which the clutch release bearing is mounted for sliding.

As illustrated, this radial projection is formed by a split elastic ring 50 engaged radially in a groove 51 in the pin 44.

A split elastic ring of this kind is intended to cooperate directly for retention purposes with the front face of the corresponding lug 36, that is to say with that face of the lug which faces in the same direction as the associated driving element 18.

In order that this will not result in a reduction of the axial movement of the clutch release bearing 30, the front face of the radial extension of the transverse plate 20, on which the lug 36 in question is formed, is preferably offset, as illustrated, axially towards the rear in relation to the corresponding face of the said plate by a distance D corresponding at least to the axial space occupied by the split elastic ring 50.

In other embodiments (not shown) each of the lugs 36 in the embodiments illustrated in FIGS. 1 to 4 may be replaced by a fork 36' or a yoke 37.

Furthermore, when one of the lateral guide passages according to the invention constitutes a yoke of this kind, and when therefore a tubular sleeve is associated with it in an arrangement permitting radial sliding as described with reference to FIGS. 1 to 3, this sleeve may be radially clipped in the said yoke and thus be permanently retained by the clutch release bearing for which it is provided; for example, the free ends of the arms of the yoke may be provided opposite one another with projections or returns, which the associated sleeve must first elastically pass when placed in position in the said yoke.

In the foregoing the operating element comprises a transverse plate of synthetic plastic material, against which an annular metal plate is locally applied in order to support the associated displacement control means. The metal plate is referred to as a reinforcing plate, and the lateral guide passages are formed on radial extensions of the transverse plate, in bosses integrally moulded as part of the plate.

Thus, in a traditional arrangement it is the transverse plate of the operating element that forms the general framework of the bearing, the metal reinforcing plate simply locally increasing its thickness in order to prevent direct contact between it and the displacement control means which might damage it by wear and/or creep.

Consequently, the transverse plate of this operating element must assume two functions, namely on the one hand it must have sufficient strength to support the other component elements of the bearing in question, and on the other hand it must have friction characteristics adapted to permit sliding without jamming or seizing on the guide elements with which the bearing is engaged.

These two functions are not in themselves in conflict with one another, but since the material used is synthetic material which in itself advantageously complies with sliding requirements, in practice in order to comply with requirements in respect of strength this synthetic material requires reinforcement, for example with the aid of glass fibres, and also reinforcement by ribs of the radial extensions of the plate.

With the aid of FIGS. 8 to 17 an arrangement will now be described which makes it possible to comply at reduced cost with the dual requirement of strength and sliding mentioned above, this arrangement in addition offering other advantages.

According to this arrangement, the operating element 16 of the bearing 10 in question is reduced to a generally annular metal plate 21 which forms the framework of the bearing.

This is in practice the so-called reinforcing plate usually provided for supporting the displacement control means constituted by the fingers 15 of the clutch release fork, as described above with reference to FIGS. 1 to 7.

It is for this reason that this plate is given the same reference number 21 as that used in FIGS. 1 to 7.

The same applies to other elements serving the same purpose.

As described above in connection with FIGS. 1 to 7, one or more guide passages 36 are in addition provided for the engagement of the said bearing 10 on pins or other guide elements 44 shown in fine lines in FIGS. 9, 10, and 11.

In the embodiment illustrated, two such guide passages 36 are provided in substantially diametrically opposite positions.

According to the invention each of these guide passages 36 is formed in a separate guide stud 55 attached individually to the metal plate 21 which therefore constitutes a support plate for the stud; a guide stud of this kind is preferably of synthetic material having a low coefficient of friction, such as that sold under the trade name "NYLON", for example.

Thus, the support plate for the guide studs 55 is formed by the previously mentioned reinforcing plate and in practice, in the example of embodiment illustrated and as already emphasised above, the operating element 16 is reduced to this reinforcing plate.

In order to enable the guide stud 55 to be placed in position the metal plate 21 has two lugs 56, in the opening 57 of each of which a guide stud 55 is engaged.

In the embodiment illustrated, a lug 56 of this kind is axially set back in relation to the remainder of the annular plate 21 and thus projects on the rear face of the latter.

On the side where the front face of the metal plate 21 is situated each guide stud 55 has a support shoulder 58 and, on the side where the rear face of the said metal plate 21 is situated, a retaining ring 60 is engaged on the guide stud to such an extent as to make contact with the metal plate 21.

In practice a retaining ring 60 is engaged on a guide stud 55 by a force fit, in a manner known per se, so that the stud is firmly secured in relation to the metal plate 21 carrying it.

In practice, and as illustrated, the lugs 56 carrying the guide studs 55 are formed at the end of legs 62 and the latter, with the exception of the lugs, are, as mentioned above, level with the remainder of the plate 21 to which they belong.

This has the consequence that on that portion of its contour by which it is attached to the corresponding leg 62 each lug 56 is bounded by a generally cylindrical wall 63, which is generally perpendicular to the plane of the lug and the plane of the remainder of the plate 21, and which makes the connection between these planes.

The cylindrical walls 63 advantageously effect a significant stiffening of the plate 21.

Furthermore, they are advantageously capable of effecting by themselves, on the outer periphery of the plate 21, the axial guiding of the fingers 15 of the clutch release fork.

In connection with the stiffening of the plate 21, this is achieved by a rim 65 which extends on the outer periphery of the plate 21, over the legs 62 extending the said plate; as illustrated in FIG. 9, the hooks 30 are formed by axial extensions of the rim 65 and in the example illustrated each hook 30 is laterally flanked on each side by a cutout 66 provided in the rim 65.

In connection with the axial guiding of the fingers 15 of the clutch release fork, in the embodiment illustrated the plate 21 is also provided on its inner periphery with two right-angled returns 48 parallel to the cylindrical walls 63 and extending in the same direction.

For the expedient retaining of the clutch release bearing 10 on the clutch release fork concerned during the handling of the whole arrangement, one of these right-angled returns 48 is in turn terminated by a right-angled return 49 forming a hook.

In other respects the component elements, the utilisation and the functioning of the clutch release bearing 10 illustrated in FIGS. 8 to 17 are similar to the component element, the operation, and the functioning of the clutch release bearing illustrated in FIGS. 1 to 7.

As will be understood, in addition to its function of stiffening the plate 21, the rim 65 of the latter also effects a limitation of the radial movement of the ball bearing 26 in relation to the metal plate 21 to which it is axially applied.

In a modified embodiment (not shown) the limitation of the radial movement of the ball bearing 26 can be achieved by means of small tongues formed locally by cutting the metal plate 21.

The arrangement described with reference to FIGS. 8 to 17 leads to an advantageous dissociation between the functions of strength and sliding which have to be performed, the function of sliding being taken over locally solely by the guide stud or studs according to the invention, independently of the function of strength, which in turn is taken over by the support plate on which these guide studs are attached.

It is consequently possible to make these guide studs and this support plate of different materials selected as being the most suitable for the corresponding functions, as described above.

In addition, when, as described above, this support plate forms the actual framework of the clutch release bearing, this has the advantageous consequence of additionally reducing the axial dimensions of the bearing, reducing the cost of manufacture and assembly, and providing greater flexibility under its conditions of use.

In connection with the last point, the guiding of the associated control means may in fact be effected equally well either on the outer periphery of the metal plate forming the framework of the bearing or on the inner periphery of this plate, the latter correspondingly having for this purpose, as described above, right-angled returns suitable for such guiding, or any similar surfaces perpendicular to its plane.

Finally, this arrangement according to the invention is favourable to an improvement of the rigidity of the clutch release bearing in question.

The metal plate forming the framework of the clutch release bearing can in fact easily be made as rigid as desired by providing it with rims or ribs formed by stamping during its production.

Consequently it is not necessary for the guide studs to be backed by any cumbersome reinforcing ribs, and this contributes once again towards reducing the overall dimensions of the release bearing.

The present invention is not limited to the embodiments described and illustrated, but includes any modified embodiment and/or combination of their various elements within the scope of the appended claims.

I claim:

1. A clutch release bearing of the kind comprising an operating element to be coupled to a clutch release fork, a driving element cooperable with a release mechanism for operating a clutch, and an antifriction bearing operatively disposed between said operating and driving elements, and means for mounting said anti-friction bearing on said operating element relative radial movement and for permitting self centering of said anti-friction bearing in the course of normal operation in case of misalignment, and guide means for guiding said clutch release bearing for axial displacement, said guide means being the sole guide means for said clutch release bearing and being disposed exclusively laterally offset from the axis of said clutch release bearing and comprising lateral guide passages formed in said operating element cooperable with fixed guide elements for defining an axial path of displacement of the entire release clutch bearing.

2. A clutch release bearing according to claim 1, there being provided three spaced apart, laterally offset guide passages, equidistant from one another.

3. A clutch release bearing according to claim 1, wherein said operating element comprises a transverse plate with a central cut out and a radial extension for each guide passage.

4. A clutch release bearing according to claim 1, wherein a face of one of the radial extensions, on the side of said driving element, is axially offset relative to said transverse plate away from said driving element.

5. A clutch release bearing according to claim 1, wherein at least one of said guide passages has a closed periphery and defines a lug.

6. A clutch according to claim 1, wherein at least one said guide passages is laterally open facing away from the axis of said clutch release bearing and defines a fork.

7. A clutch release bearing of the kind comprising an operating element intended to be subjected to the action of a movement control means, and a driving element intended to act through the action of said operating element on a release device of a clutch, said operating element having a guide passage forming means for effecting engagement of the clutch release bearing on a fixed guide element, said guide passage in said operating element being laterally offset from the axis of said clutch release bearing, said guide passage being shaped to permit slight displacement of said operating element perpendicular to the axis of said clutch release bearing to compensate for manufacturing tolerances between a fixed guide element on which said guide passage is to be received and differential thermal expansion of said clutch release bearing parts, said guide passage comprises two guide flanks substantially parallel to an axial plane of said clutch release bearing through a median zone.

8. A clutch release bearing according to claim 7 wherein said tubular sleeve is radially movable in said guide passage.

9. A clutch release bearing according to claim 7, wherein said parallel guide flanks form inner leg surfaces of a yoke defined by said guide passage.

10. A clutch release bearing of the kind comprising an operating element adapted to be coupled to a clutch release fork and being in the form of an annular metal reinforcement plate, a driving element cooperable with a clutch release mechanism, and an anti-friction bearing operatively disposed between said operating and driving elements, means for mounting said anti-friction bearing on said operating element for permitting self centering of said anti-friction bearing in the course of normal operation in case of misalignment, a guide stud separately attached to said reinforcement plate, said guide stud defining a guide passage for mounting said clutch release bearing on a guide element for guided axial displacement, said guide passage being arranged laterally offset from the axis of said clutch release bearing.

11. A clutch release bearing according to claim 10, wherein said reinforcement plate defines a lug having an opening in which said guide stud is received, said lug being axially set back in relation to adjoining portions of said reinforcement plate.

12. A clutch release bearing according to claim 11, wherein said reinforcement plate comprises a right-angled portion adapted to guide axially an associated clutch release fork.

13. A clutch release bearing according to claim 11, wherein said guide stud has a support shoulder bearing against one side of said reinforcement plate, and said clutch release bearing further comprises a retaining ring received around said guide stud and bearing on the other side of said reinforcement plate opposite said support shoulder.

14. A clutch release bearing according to claim 1, wherein said operating element comprises a transverse plate with a central cut out and a radial extension for each guide passage.

* * * * *